United States Patent [19]

Hamada et al.

[11] Patent Number: 4,990,388
[45] Date of Patent: * Feb. 5, 1991

[54] OPTICAL INFORMATION RECORDING MEDIUM

[75] Inventors: Emiko Hamada; Yuji Arai; Yuaki Shin; Takashi Ishiguro, all of Tokyo, Japan

[73] Assignee: Taiyo Yuden Co., Ltd., Tokyo, Japan

[ * ] Notice: The portion of the term of this patent subsequent to Jul. 10, 2007 has been disclaimed.

[21] Appl. No.: 340,082

[22] Filed: Apr. 14, 1989

[30] Foreign Application Priority Data

| Jul. 30, 1988 | [JP] | Japan | 63-191716 |
| Aug. 26, 1988 | [JP] | Japan | 63-213386 |
| Sep. 16, 1988 | [JP] | Japan | 63-231820 |
| Sep. 24, 1988 | [JP] | Japan | 63-239165 |
| Oct. 26, 1988 | [JP] | Japan | 63-270409 |
| Jan. 14, 1989 | [JP] | Japan | 1-7511 |
| Jan. 14, 1989 | [JP] | Japan | 1-7512 |

[51] Int. Cl.$^5$ ............................................. B32B 3/02
[52] U.S. Cl. .................................... 428/64; 428/65; 428/209; 428/457; 428/903; 369/275; 369/288; 346/76 L; 346/135.1; 430/945
[58] Field of Search ............ 428/64, 65, 209, 457, 428/913; 369/275, 288; 346/76 L, 135.1; 430/945

[56] References Cited

U.S. PATENT DOCUMENTS

| 4,315,269 | 2/1982 | Bloom et al. |
| 4,360,908 | 11/1982 | Howe et al. |
| 4,398,203 | 8/1983 | Cornet |
| 4,404,656 | 9/1983 | Cornet |
| 4,405,994 | 9/1983 | Cornet et al. |
| 4,577,291 | 3/1986 | Cornet |
| 4,586,165 | 4/1986 | Cornet et al. |

FOREIGN PATENT DOCUMENTS

| 0132410 | 1/1985 | European Pat. Off. |
| 59-40336 | 3/1984 | Japan |

OTHER PUBLICATIONS

IBM Technical Disclosure Bulletin, vol. 25, No. 11B, Apr. 1983, Armonk USA pp. 5940–5941; K. Y. Ahn & Al; "Deformed Mirror Optical Storage Structure".

Primary Examiner—Patrick J. Ryan
Attorney, Agent, or Firm—Oblon, Spivak, McClelland, Maier & Neustadt

[57] ABSTRACT

The present invention pertains to an optical information recording medium featuring a layered surface composition. A first surface is made of a light transmitting substrate, which has a second light absorptive layer which is laid on top of the light transmitting substrate. A light reflective layer is laid on top of the light absorptive layer. The light transmitting substrate will have a surface layer, which is adjacent to the light absorptive layer. This surface layer, is deformable by energy generated upon absorption of a laser beam by the light absorptive layer, to thereby form optically readable pits.

11 Claims, 5 Drawing Sheets

OPTICAL INFORMATION RECORDING MEDIUM

The present invention relates to an optical information recording medium of the type wherein data can be recorded by a laser beam and the recorded data can be reproduced by a laser beam of less power.

Conventional optical information recording media of such type have a recording layer of e.g. a metal such as Te, Bi or Mn or a dye such as cyanine, merocyanine or phthalocyanine, and are designed to record data in such a manner that when irradiated with a laser beam, such recording layer is deformed, sublimed, evaporated or modified to form pits. With optical information recording media having such a recording layer, it is common to form a space behind the recording layer to facilitate the deformation, sublimation, evaporation or modification of the recording layer for the formation of the pits. A typical example is a laminated structure, so-called an air sandwich structure, wherein a pair of substrates are laminated with a space therebetween.

With the optical information recording media of this type, a writing laser beam is irradiated through a transparent substrate to form optically readable pits in the recording layer. For reproducing the recorded data, a reading laser beam having a less power than the writing laser beam is irradiated through the substrate, and the contrast between the light reflected from the pits and the light reflected from non-pitted portion is read as an electrical signal.

On the other hand, optical information recording media of the so-called ROM (read only memory) type, wherein data are already recorded and no further data are recordable or the recorded data are not erasable or rewritable, are widely practically employed in the sound recording and information treating fields. Optical information recording media of this type have no such recording layer as described above. Pits corresponding to data to be reproduced are already formed on a substrate of e.g. polycarbonate by e.g. press molding, a reflective layer of a metal such as Au, Ag, Cu or Al is formed thereon, and a protective layer is further provided thereon.

The most typical optical information recording medium of this ROM type is a compact disc, so-called CD, which is widely used in the sound recording and information treating fields. The specifications for recording and reading-out signals for this CD is standardized, as a so-called CD format, and the reproducing or play-back apparatus for CD in accordance with this format is widely available as compact disc players (CD players).

The above-mentioned optical information recording media employ a laser beam in the same manner as CD. Therefore, it is strongly desired for such media to follow the same standards as the widely prevailing standards for CD.

However, conventional optical information recording media have a recording layer which is not present in CD, and they are designed to form pits in the recording layer and not in the substrate. Further, in some cases, a space is provided to facilitate the formation of pits in this recording layer. Consequently, the read-out signals are naturally different from those of CD. Therefore, it has been difficult for the conventional optical information recording media to meet the above-mentioned so-called CD standards for CD. Particularly, the reflectance and the degree of modulation of the read-out signals used is too low to meet the standards.

Therefore, it is an object of the present invention to provide a writable optical information recording medium which is capable of providing high reflectance and read-out signals having a high degree of modulation to meet the CD standards.

The present invention is based on a discovery that optically readable pits can be formed directly on the substrate by a laser beam by means of a laser beam absorptive layer which functions as a means to form such pits, whereby, it is possible to obtain a recordable optical disc which meets the CD standards.

The present invention provides an optical information recording medium comprising:
 a light transmitting substrate;
 a light absorptive layer overlaying the substrate to absorb a laser beam; and
 a light reflective layer overlaying the light absorptive layer,
 wherein said substrate has a layer, adjacent to the light absorptive layer, which is deformable by energy generated upon absorption of the laser beam by the light absorptive layer, to form optically readable pits.

For the purpose of the present invention, the term "optically readable pits" or "pits" generally includes optically readable or detectable marks of all kinds.

With this optical information recording medium, when the light absorptive layer is irradiated with a laser beam, it generates heat upon absorption of the laser beam and at the same time, it undergoes melting, evaporation, sublimation, reaction, decomposition or modification. When the laser beam is applied in a focused state to the light absorptive layer, energy is locally generated. The impact of such energy reaches the surface layer of the substrate adjacent to the light absorptive layer, whereby the surface layer is locally deformed to form optically modified portions (optically readable pits).

Thus, the optically modified portions formed on the surface layer of the substrate are different from those formed in the conventional recording layer, and they rather resemble pits of CD which are preformed on a substrate surface by e.g. press molding. In the optically writable information recording medium of such a structure, a reflective layer can be provided on the light absorptive layer in close contact therewith. Thus, also from the configuration point of view, the optical information recording medium of the present invention is similar to CD. It is particularly significant that it is thereby possible to readily obtain an optically writable information recording medium, particularly a write-once type recordable optical disc, which meets the CD standards with respect to the reflectance of the reading laser beam, the degree of modulation of the read-out signals and the block error rate.

Now, the preferred embodiments of the present invention will be described with reference to the drawings, in which:

FIGS. 15 (a) and (b) are graphs showing the relation between the moving distance of a tip or probe along the track and the height of the pit or protuberance when the surface of the transparent substrate of FIG. 14 was observed by STM (Scanning Tunneling Microscope).

FIGS. 1 to 11 diagrammatically illustrate various structures of the optical information recording medium of the present invention. In these Figures, reference numeral 1 indicates a light transmitting substrate, numeral 2 indicates a light absorptive layer overlaying the substrate, and numeral 3 indicates a light reflective layer overlaying the light absorptive layer. Reference numeral 4 indicates a protective layer.

The light transmitting substrate 1 is made of a material having high transparency to laser beams and is usually made of a resin having excellent strength such as a polycarbonate, an acrylate resin or an epoxy resin. However, the substrate may be made of any other material so long as it is transparent to writing and reading laser beams and at least the surface layer adjacent to the light absorptive layer is deformable by energy generated by the light absorptive layer upon absorption of the writing laser beam, to form optically readable pits. In this respect, the substrate or at least the surface layer thereof preferably has a heat distortion temperature within a range of from 85° to 200° C., more preferably from 90° to 150° C., as measured in accordance with ASTM D648 under a load of 4.6 kg/cm² and/or a Rockwell hardness within a range of from M200 to M75, more preferably from M105 to M80, as measured in accordance with ASTM D785. When the heat distortion temperature or the Rockwell hardness of the substrate is within the above-mentioned range, the energy generated by the light absorptive layer 2 upon absorption of the writing laser beam can effectively be absorbed by the local deformation of the surface layer of the substrate 1 so that no substantial strain will remain in the formed pits, whereby the stability of the recorded data will be secured. If the heat deformation temperature or the hardness is too low, the formed pits will tend to be easily deformed by heat or external force, whereby the stability will be poor. On the other hand, if the heat distortion temperature or the hardness is too high, the energy generated by the light absorptive layer 2 can hardly be absorbed in the form of deformation of the substrate 1, and it is difficult to form distinct pits 5, whereby it will be difficult to obtain read-out signals having a high degree of modulation.

The thickness of the substrate 1 is not critical, but it is usually within a range of from 1.1 to 1.5 mm.

The light absorptive layer 2 is a layer which absorbs a laser beam entered through the light transmitting substrate 1, whereupon it generates heat and at the same time undergoes melting, evaporation, sublimation, reaction, decomposition or modification. It is formed usually by spin coating a dye material such as a cyanine dye on the substrate 1 or on an inter-layer 6 formed on the substrate 1.

The thickness of the light absorptive layer 2 is usually within a range of from 20 to 500 nm, preferably from 100 to 300 nm.

The light reflective layer 3 is usually made of a metal such as gold, silver, copper, aluminum or an alloy thereof. The thickness of the light reflective layer 3 is usually within a range of from 30 to 150 nm, preferably from 40 to 130 nm.

The protective layer 4 is made of a resin excellent in impact resistance like the light transmitting substrate 1 and is most commonly formed by coating a ultraviolet curable resin by spin coating, followed by irradiation with ultraviolet rays for curing. Other materials such as an epoxy resin, an acrylate resin and a silicone hard coat resin, may usually be used. It is also possible to employ a resilient material such as a urethane resin to obtain a cushion effect.

The thickness of the protective layer 4 is not critical and is usually within a range of from 3 to 30 μm, preferably from 5 to 15 μm.

Figure 3:
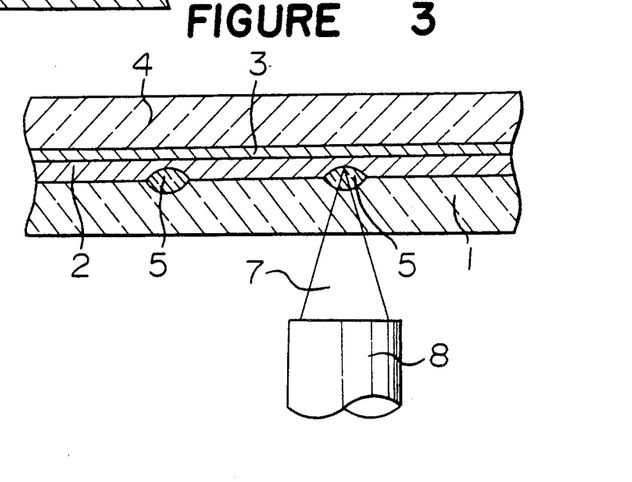
FIG. 3 is a partially enlarged cross-sectional view taken along the track of the optical information recording medium of FIG. 1 after the optical recording.
Figure 4:
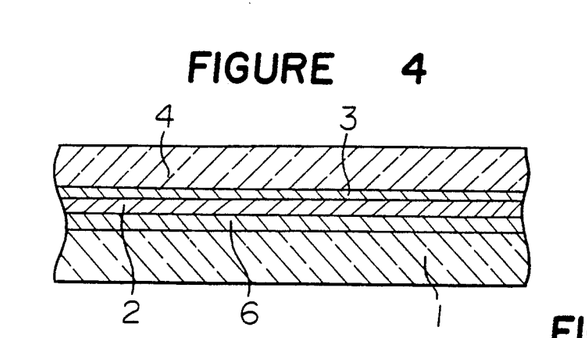
FIG. 4 is a partially enlarged cross-sectional view taken along the track of another embodiment of the optical information recording medium of the present invention prior to optical recording.
Figures 5, 6, 7:
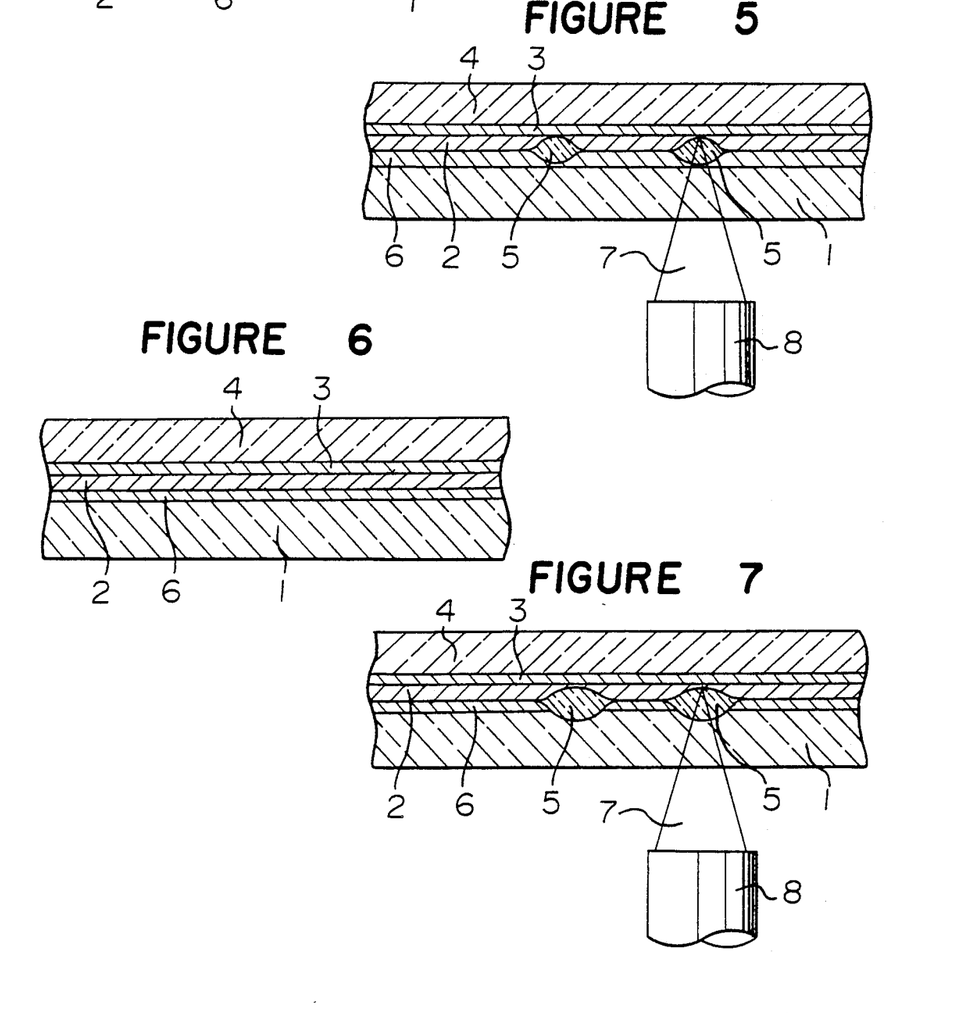
FIG. 5 is a partially enlarged cross-sectional view taken along the track of the same embodiment after the optical recording.
FIG. 6 is a partially enlarged cross-sectional view taken along the track of a still another embodiment of the optical information recording medium of the present invention prior to optical recording.
FIG. 7 is a partially enlarged cross-sectional view taken along the track of the embodiment of FIG. 6 after the optical recording.

As shown in FIGS. 4 to 7, an inter-layer 6 such as a resin layer or a solvent resistant layer may be disposed between the substrate 1 and the light absorptive layer 2. As shown in FIGS. 5 and 7, such an inter-layer 6 is deformed by the energy generated by the light absorptive layer 2 upon absorption of the writing laser beam to form optically modified pits 5. If such an inter-layer 6 is sufficiently thick, pits 5 will be formed therein as shown in FIG. 5, whereby the inter-layer serves as the surface layer of the substrate 1. If the inter-layer 6 is relatively thin, i.e. has a thickness of at most 30 nm, not only the inter-layer 6 but also the substrate 1 will be deformed as shown in FIG. 7. When such an inter-layer 6 is not present, the surface layer of the substrate 1 will be deformed as shown in FIG. 3 to form optically modified pits 5.

The inter-layer 6 preferably has a heat distortion temperature within a range of from 50° to 150° C., more preferably from 85° to 140° C., as measured in accordance with ASTM D648 under a load of 4.6 kg/cm² and/or a Rockwell hardness within a range of from M100 to M50, more preferably from M95 to M75, as measured in accordance with ASTM D785. The heat distortion temperature and the Rockwell hardness of the inter-layer 6 within the above ranges are preferred for the same reasons as mentioned with respect to the heat distortion temperature and the Rockwell hardness of the substrate 1. The inter-layer 6 may be made of a resin such as an acrylate resin, a vinyl chloride resin, a vinylidene chloride resin, a polystyrene resin, a polyester resin, a polyurethane resin, a cellulose resin or a silicone resin. However, any other resin may be employed as long as it satisfies the above-mentioned properties for the inter-layer 6.

The thickness of the inter-layer is usually within a range of from 2 nm to 500 μm, preferably from 10 to 200 nm.

Figure 8:
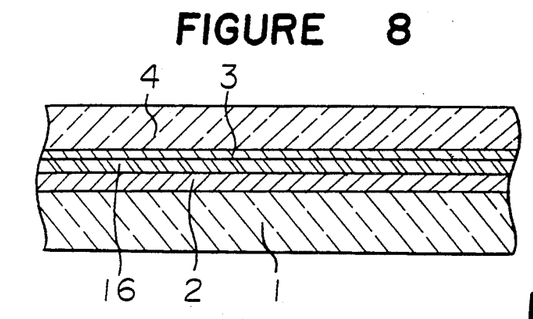
FIG. 8 is a partially enlarged cross-sectional view taken along the track of a further embodiment of the present invention prior to optical recording.
Figure 9:
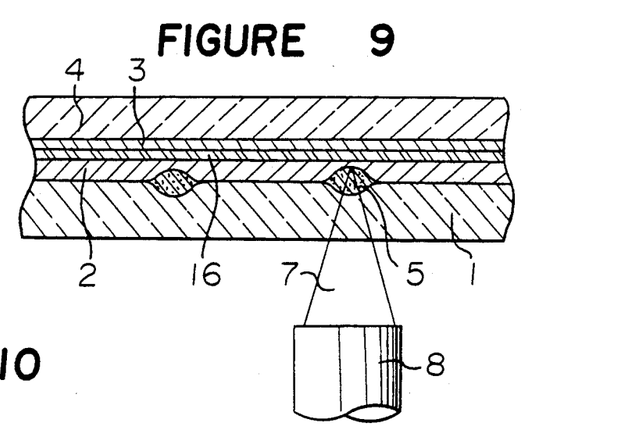
FIG. 9 is a partially enlarged cross-sectional view of the embodiment of FIG. 8 after the optical recording.
Figure 10:
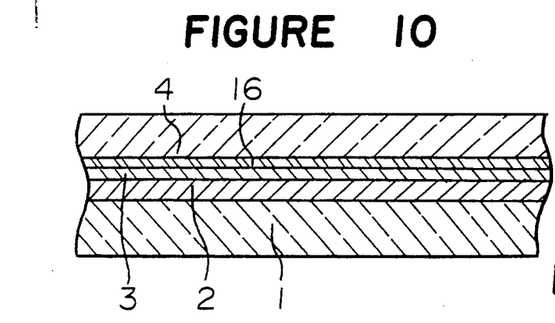
FIG. 10 is a partially enlarged cross-sectional view taken along the track of a still further embodiment of the optical recording medium of the present invention prior to optical recording.
Figure 11:
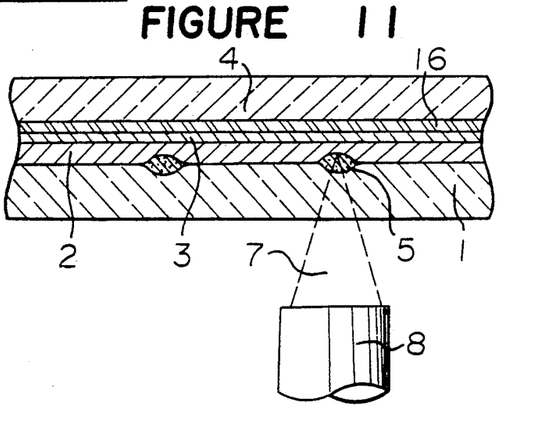
FIG. 11 is a partially enlarged cross-sectional view taken along the track of the embodiment of FIG. 10 after the optical recording.

Further, a hard layer 16 more hardly heat-deformable than the substrate may be disposed between the light absorptive layer 2 and the light reflective layer 3 as shown in FIGS. 8 and 9, or on the light reflective layer 3 as shown in FIGS. 10 and 11. The hard layer 16 is made of a material more hardly heat-deformable than the substrate and preferably has a Rockwell hardness of at least M100, as measured in accordance with ASTM D785 and/or a heat distortion temperature of at least 100° C., more preferably at least 130° C., as measured in accordance with ASTM D648 under a load of 4.6 kg/cm².

Each of FIGS. 2, 4, 6, 8 and 10 illustrates a state prior to optical recording by a laser beam. Each of FIGS. 3, 5, 7, 9 and 11 illustrates a state after the optical recording. Namely, when a laser beam 7 from an optical pickup 8 is irradiated in a focused state to the light absorptive layer 2, the surface layer of the substrate 1 is locally deformed by the energy generated at the light absorptive layer 2, to form optically modified pits 5, as diagrammatically illustrated in these Figures.

Figure 12:
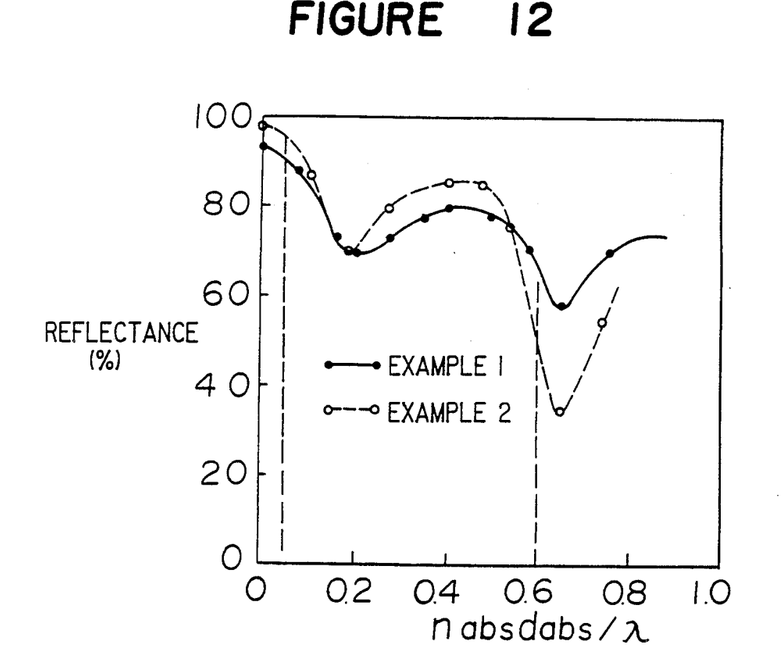
FIG. 12 is a graph showing the relation between an optical parameter represented by the formula $\rho = n_{abs} \cdot d_{abs}/\lambda$ where $n_{abs}$ is the real part of the complex refractive index of the light absorptive layer of the optical disc, $d_{abs}$ is the thickness of the light absorptive layer and $\lambda$ is the wavelength of the reading laser beam and the reflectance of the reading laser beam.
Figure 13:
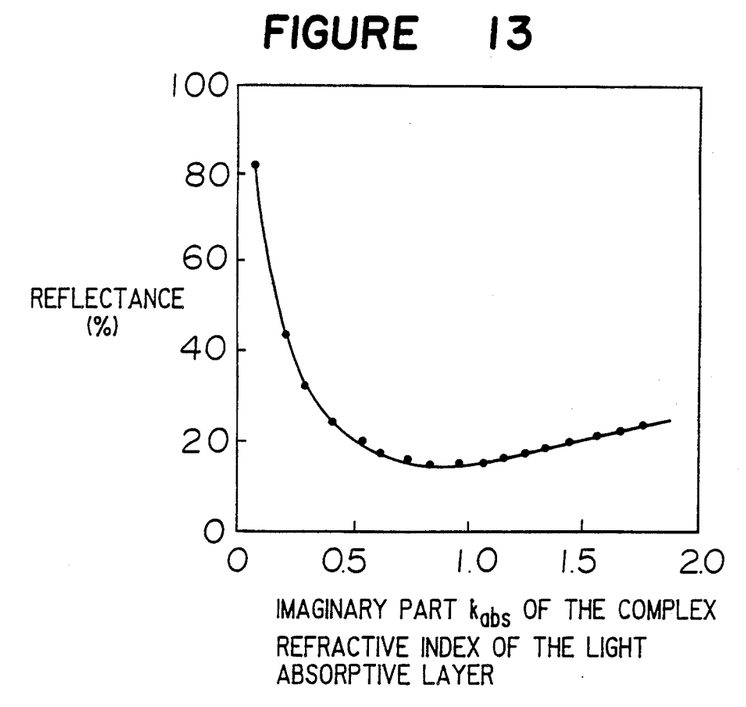
FIG. 13 is a graph showing the relation between the imaginary part $k_{abs}$ of the complex refractive index of the light absorptive layer of the optical disc and the reflectance of the reading laser beam.

In the optical information recording medium of the present invention, it is preferred that an optical parameter represented by $\rho = n_{abs}d_{abs}/\lambda$ where $n_{abs}$ is the real part of the complex refractive index of the light absorptive layer, $d_{abs}$ is the thickness of the light absorptive layer and $\lambda$ is the wavelength of a reading laser beam, is $0.05 \leq \rho \leq 0.6$, and the imaginary part $k_{abs}$ of the complex refractive index of the light absorptive layer is at most 0.3. FIG. 12 is a graph showing the relation between the optical parameter $\rho = n_{abs}d_{abs}/\lambda$ where $n_{abs}$ is the real part of the complex refractive index of the light absorptive layer 2 of the optical disc, $d_{abs}$ is the thickness of the light absorptive layer 2 and $\lambda$ is the wavelength of a reading laser beam and the reflectance of light entered through the substrate, when a semiconductor laser beam having a wavelength $\lambda$ of 780 nm was used as the reading laser beam, with respect to two examples of the optical disc. Further, FIG. 13 shows the reflectance when the imaginary part $k_{abs}$ was changed from a value close to 0 to a value of 2.0 by changing the light transmittance of the light absorptive layer while maintaining the real part of the complex refractive index to a constant level of $n_{abs}=2.4$, with respect to an optical disc wherein a gold film was used as the light reflective layer. From these Figures, it is evident that when the optical parameter of $\rho = n_{abs}d_{abs}/\lambda$ and the imaginary part $k_{abs}$ satisfy the above-mentioned conditions, a high reflectance is obtainable, whereby it is readily possible to secure the standard properties stipulated in the CD standards, i.e. the reflectance of at least 70%.

Figure 14:
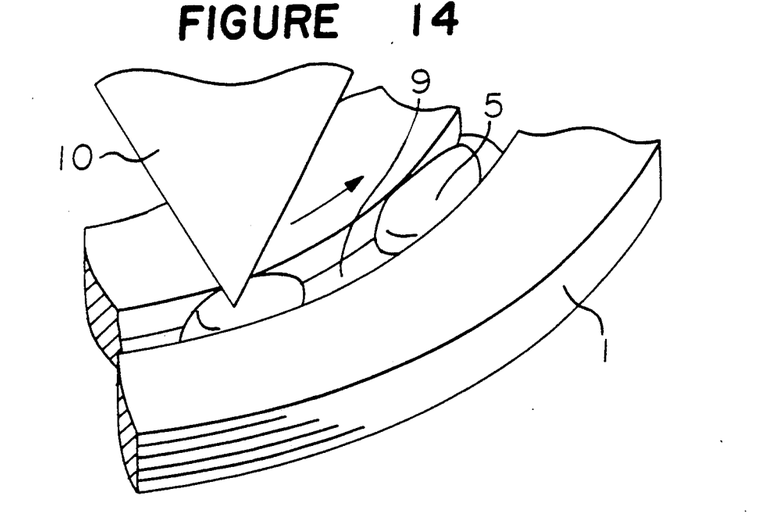
FIG. 14 is a partially enlarged diagrammatical perspective view of the surface of the light transmitting substrate of the optical information recording medium of the present invention after optical recording.

FIG. 14 diagrammatically illustrates the surface of the light transmitting substrate 1 of the optical information recording medium of the present invention having the protective layer 4, the light reflective layer 3 and the light absorptive layer 2 removed after optical recording. Namely, in order to form pits 5 along a pregroove 9 which is a tracking guide groove formed on the surface of the substrate 1, a focused laser beam modulated by EFM signals was irradiated to the light absorptive layer 2 along the pregroove 9, and then the protective layer 4 and the light reflective layer 3 was peeled off from the substrate 1. Thereafter, the light absorptive layer 2 was also removed from the surface of the substrate 1.

Figure 15A:
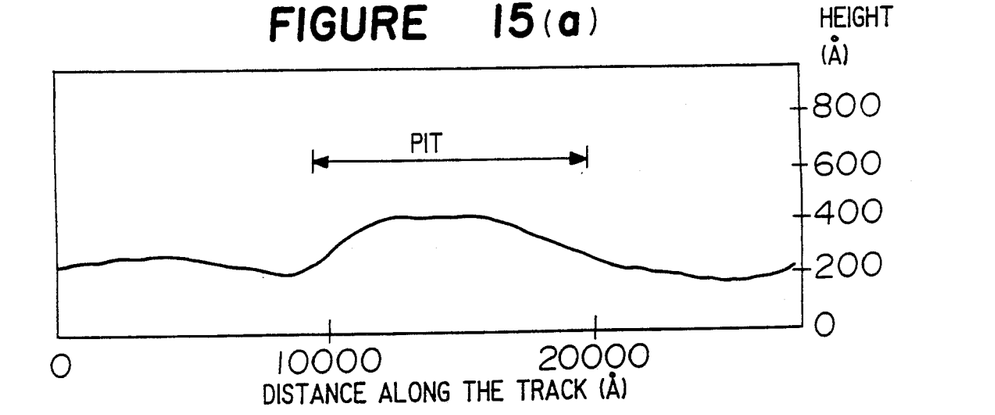
Figure 15B:
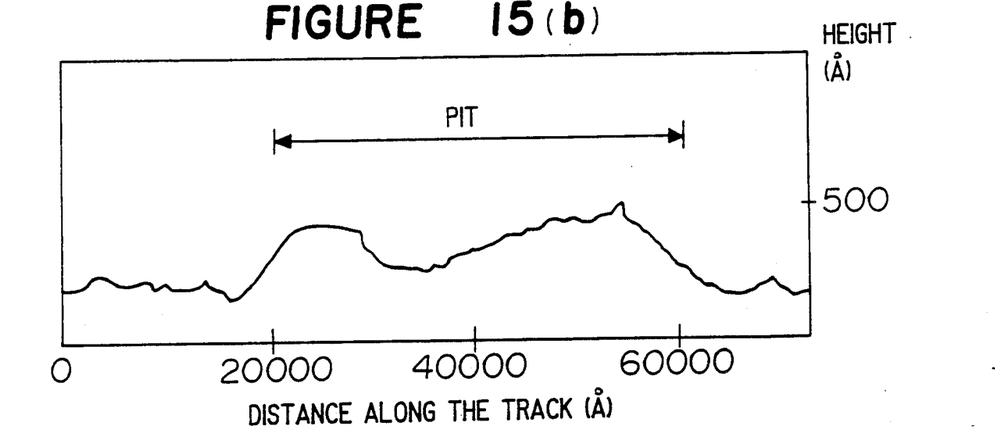

Further, the surface of the light transmitting substrate 1 was observed along the pregroove 9 by STM (Scanning Tunneling Microscope). The results are shown in FIGS. 15(a) and (b). In these Figures, the abscissa indicates the moving distance of a tip (probe) 10 along the pregroove 9, i.e. in the tracking direction, and the ordinate indicates the height of the surface of the substrate 1. FIG. 15(a) illustrates a case where the length of a pit is relatively short at a level of 10,000 Å, whereby it is evident that a clear deformation in the form of a protuberance with a height of about 200 Å is formed. Likewise, FIG. 15(b) illustrates a case where the length of a pit is relatively long at a level of 40,000 Å, whereby a deformation in the form of a protuberance with a height of about 200 Å is observed, but the protuberance has two peaks with a slightly lower portion at the center. Thus, in a preferred embodiment, optically readable pits are formed in the pregroove 9 as a tracking guide groove formed on the deformable surface layer of the substrate 1.

In the optical information recording medium of the present invention, a layer behind the light absorptive layer 2 relative to the light transmitting substrate 1, such as the light reflective layer 3 or the protective layer 4, is preferably made of a material having a heat deformation temperature and a hardness higher than the layer on which pits 5 are formed. By forming the layer behind the absorptive layer 2 with a hard material, the block error rate of recorded signals can effectively be reduced, whereby it is readily possible to meet the standard requirement of BLER (block error rate) being not higher than $3 \times 10^{-2}$ as prescribed in the CD standards.

Now, the present invention will be described in further detail with reference to Examples. However, it should be understood that the present invention is by no means restricted to such specific Examples.

EXAMPLE 1

A polycarbonate substrate 1 having a thickness of 1.2 mm, an outer diameter of 120 mm and an inner diameter of 15 mm and having a spiral pregroove formed on its surface with a width of 0.8 μm, a depth of 0.08 μm and a pitch of 1.6 μm, was formed by injection molding. This polycarbonate substrate 1 had a Rockwell hardness (ASTM D785) of M75 which corresponds to HB of the pencil hardness and a heat distortion temperature (ASTM D648) of 121° C. under a load of 4.6 kg/cm².

As an organic dye to form the light absorptive layer 2, 0.65 g of 1,1'-dibutyl-3,3,3',3'-tetramethyl-4,5,4',5'- dibenzoindodicarbocyanine perchlorate (product number NK3219, manufactured by Nippon Kanko Shikiso Kenkyusho) was dissolved in 10 ml of a diacetone alcohol solvent, and the solution was coated on the surface of the substrate 1 by spin coating to form a light absorptive layer 2 of a light sensitive dye film having a thickness of 130 nm. The optical parameter $\rho = n_{abs}d_{abs}/\lambda$ where $n_{abs}$ is the real part of the complex refractive index of the light absorptive layer 2, $d_{abs}$ is the thickness of the layer and $\lambda$ is the wavelength of a read-out laser beam, was 0.45, and the imaginary part $k_{abs}$ of the complex refractive index was 0.05.

Then, a gold film having a thickness of 80 nm was formed by sputtering on the entire surface of the region covered by the diameter of from 45 to 118 mm of this disc, to form a light reflective layer 3. Further, on this light reflective layer 3, an ultraviolet curable resin was spin-coated and then cured by irradiation with ultraviolet rays, to form a protective layer 4 having a thickness of 10 μm. After the curing, this protective layer 4 had a Rockwell hardness (ASTM D785) of M90 and a heat distortion temperature (ASTM D648) of 135° C. under a load of 4.6 kg/cm$^2$.

To the optical disc thus obtained, a semiconductor laser having a wavelength of 780 nm was irradiated at a linear speed of 1.2 m/sec at a recording power of 6.0 mW, to record EFM signals. Then, this optical disc was played back by a commercially available CD player (Aurex XR-V73, wavelength of the reading laser beam $\lambda = 780$ nm), whereby the reflectance of the semiconductor laser beam was 72%, $I_{11}/I_{top}$ was 0.68, $I_3/I_{top}$ was 0.35, and the block error rate BLER was $1.2 \times 10^{-2}$.

The CD standards prescribe that the reflectance is at least 70%, $I_{11}/I_{top}$ is at least 0.6, $I_3/I_{top}$ is from 0.3 to 0.7, and the block error rate BLER is not higher than $3 \times 10^{-2}$. The optical disc of this example meets this standards.

Further, after the recording, the protective layer 4 and the light reflective layer 3 of the optical disc were peeled off, and the exposed surface of the light absorptive layer 2 was inspected, whereby linear fine irregularities were observed which appeared to represent the outline profile of pits. Further, the light absorptive layer 2 was washed off with a solvent, and the surface of the substrate 1 was inspected, whereby formation of optically modified pits 5 was confirmed.

Figure 1:
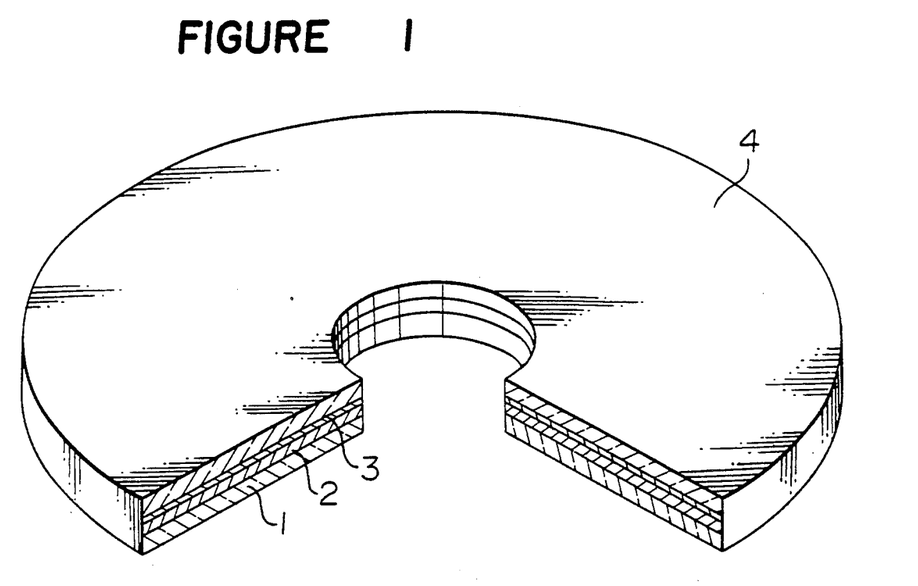
FIG. 1 is a partially cross-sectional diagrammatical perspective view illustrating an embodiment of the structure of the optical information recording medium of the present invention.
Figure 2:
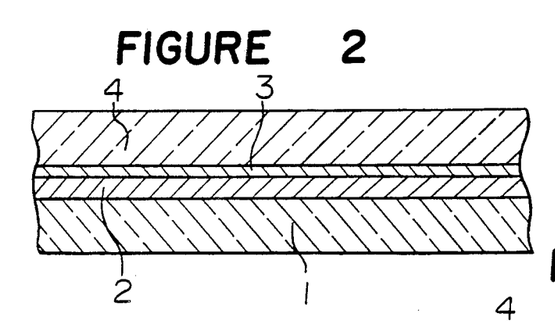
FIG. 2 is a partially enlarged cross-sectional view taken along the track of the information recording medium of FIG. 1 prior to optical recording.

The layered structure of this optical disc is diagrammatically illustrated in FIG. 2, and the same structure after the optical recording is diagrammatically illustrated in FIG. 3.

EXAMPLE 2

An optical disc was prepared in the same manner as in Example 1 except that an epoxy resin was spin-coated to form a hard layer having a thickness of 100 nm between the light absorptive layer 2 and the light reflective layer 3 in Example 1. After the curing, this epoxy resin had a Rockwell hardness (ASTM D785) of M90 and a heat distortion temperature (ASTM D648) of 135° C. under a load of 4.6 kg/cm$^2$.

To the optical disc thus obtained, EFM signals were recorded in the same manner as in Example 1. Then, this optical disc was played back by the commercially available CD player, whereby the reflectance of the semiconductor laser beam and the read-out signal output characteristics were the same as in Example 1, and the block error rate BLER was $3.0 \times 10^{-3}$. The surface of the substrate 1 of the optical disc after the recording was inspected in the same manner as in Example 1 to confirm the formation of pits 5.

EXAMPLE 3

An optical disc was prepared in the same manner as in Example 1 except that between the light absorptive layer 2 and the light reflective layer 3 in Example 1, a hard layer of a silicone acrylate resin having a thickness of 100 nm was formed by spin coating on the light absorptive layer 2 and a binding layer of an epoxy resin having a thickness of 20 nm was formed by spin coating on the upper surface of this hard layer. After curing, this silicone acryate resin layer had a Rockwell hardness (ASTM D785) of M100 and a heat distortion temperature (ASTM D648) of 100° C. under a load of 4.6 kg/cm$^2$.

To the optical disc thus obtained, EFM signals were recorded with a recording power of 7.0 mW in the same manner as in Example 1. Then, this optical disc was played back by the same CD player (Aurex XR-V73) as used in Example 1 with a semiconductor laser beam having wavelength of 780 nm, whereby the reflectance of the semiconductor laser beam was 75%, $I_{11}/I_{top}$ was 0.63, $I_3/I_{top}$ was 0.35, and the block error rate BLER was $2.5 \times 10^{-3}$. Further, the surface of the substrate 1 of the optical disc after recording was inspected in the same manner as in Example 1, to confirm the formation of pits 5.

EXAMPLE 4

An optical disc was prepared in the same manner as in Example 1 except that in this Example 4, a film of an alloy of gold and antimony in a ratio of 9:1 was formed by vacuum vapor deposition as a light reflective layer 3 on the light absorptive layer 2, and on this reflective layer 3, a protective layer 4 of a ultraviolet curable resin was formed with a binding layer of an epoxy resin having a thickness of 20 nm interposed therebetween. The above light reflective layer 3 had a hardness of at least H as pencil hardness.

To the optical disc thus obtained, EFM signals were recorded with a recording power of 6.2 mW in the same manner as in Example 1. Then, this optical disc was played back by the same CD player as used in Example 1, whereby the reflectance of the semiconductor laser beam was 72%, $I_{11}/I_{top}$ was 0.62, $I_3/I_{top}$ was 0.32, and the block error rate BLER was $3.5 \times 10^{-3}$. Further, the surface of the substrate 1 of the optical disc after recording was inspected in the same manner as in Example 1, to confirm the formation of pits 5.

EXAMPLE 5

An optical disc was prepared in the same manner as in Example 1 except that in this Example 5, an ultraviolet curable type hard coat resin was spin-coated on the incident light side of the polycarbonate substrate 1 to form a substrate protective layer having a thickness of 1 μm, the light absorptive layer 2 was formed on the side having the pregroove, and on this light absorptive layer 2, a film of an alloy of gold and iridium in a ratio of 3:1 was formed by sputtering as a light reflective layer 3. The light reflective layer 3 had a hardness of at least 5 H as pencil hardness.

To the optical disc thus obtained, EFM signals were recorded in the same manner as in Example 1. Then, this optical disc was played back by the same CD player as used in Example 1, whereby the reflectance of the semiconductor laser beam was 70%, $I_{11}/I_{top}$ was 0.62, $I_3/I_{top}$ was 0.37, and the block error rate BLER was $3.7 \times 10^{-3}$. Further, the surface of the substrate 1 of the optical disc after recording was inspected in the same manner as in Example 1, to confirm the formation of pits 5.

EXAMPLE 6

An optical disc was prepared in the same manner as in Example 1 except that in this Example 6, the light reflective layer 3 was formed by a silver layer having a thickness of 60 nm, and a silicone hard coating agent was spin-coated thereon, heated and cured to form a hard protective layer 4 having a thickness of 3 μm. The protective layer 4 had a hardness of at least of HB as pencil hardness.

To the optical disc thus obtained, EFM signals were recorded in the same manner as in Example 1. Then, this optical disc was played back by the same CD player as used in Example 1, whereby the reflectance of the semiconductor laser beam was 71%, $I_{11}/I_{top}$ was 0.63, $I_3/I_{top}$ was 0.35, and the block error rate BLER was $2.8 \times 10^{-3}$. Further, the surface of the substrate 1 of the optical disc after recording was inspected in the same manner as in Example 1, to confirm the formation of pits 5.

EXAMPLE 7

An optical disc was prepared in the same manner as in Example 1 except that in this Example 7, a polysulfide-incorporated epoxy resin diluted with diglycidyl ether was spin-coated to form a binding layer of 30 nm on the light reflective layer 3 formed by vacuum vapor deposition of a gold film having a thickness of 50 nm, and a silicone hard coating agent was spin-coated on the binding layer, heated and cured to form a hard protective layer 4 having a thickness of 3 μm.

To the optical disc thus obtained, EFM signals were recorded in the same manner as in Example 1. Then, this optical disc was played back by the same CD player as used in Example 1, whereby the reflectance of the semiconductor laser beam was 72%, $I_{11}/I_{top}$ was 0.65, $I_3/I_{top}$ was 0.35, and the block error rate BLER was $2.5 \times 10^{-3}$. Further, the surface of the substrate 1 of the optical disc after recording was inspected in the same manner as in Example 1, to confirm the formation of pits 5.

EXAMPLE 8

An optical disc was prepared in the same manner as in Example 1 except that in this Example 8, the light absorptive layer was formed by using 1,1'-dibutyl-3,3,3',3'-tetramethyl-5,5'-diethoxyindodicarbocyanine perchlorate, a hard layer of an epoxy resin having a thickness of 100 nm was formed on the light reflective layer 3, an ultraviolet curable resin was formed thereon in a thickness of 10 μm and then the protective layer 4 was formed.

To the optical disc thus obtained, EFM signals were recorded in the same manner as in Example 1. Then, this optical disc was played back by the same CD player as used in Example 1, whereby the reflectance of the semiconductor laser beam was 74%, $I_{11}/I_{top}$ was 0.68, $I_3/I_{top}$ was 0.34, and the block error rate BLER was $8.3 \times 10^{-3}$. Further, the surface of the substrate 1 of the optical disc after recording was inspected in the same manner as in Example 1, to confirm the formation of pits 5.

EXAMPLE 9

On the surface of the same polycarbonate substrate 1 as used in Example 1, an acrylate resin dissolved in diisobutyl ketone was spin-coated to form an inter-layer 6 having a thickness of 40 nm. This inter-layer 6 had a Rockwell hardness (ASTM D785) of M85 and a heat distortion temperature (ASTM D648) of 100° C. under a load of 4.6 kg/cm².

As an organic dye to form the light absorptive layer 2, 0.6 g of 1,1'-dipropyl-3,3,3',3'-tetramethyl-5,5'-dimethoxyindodicarbocyanine iodide was dissolved in 10 ml of an isopropyl alcohol solvent. The solution was coated on the surface of the above substrate 1 by spin coating to form a light absorptive layer 2 of a light sensitive dye film having a thickness of 120 nm. The optical parameter of $\rho = n_{abs} d_{abs}/\lambda$ where $n_{abs}$ is the real part of the complex refractive index of this light absorptive layer 2, $d_{abs}$ is the thickness of the layer and $\lambda$ is the wavelength of a reading laser beam, was 0.41, and the imaginary part $k_{abs}$ of the complex refractive index was 0.02.

Then, a silicone acrylate resin dissolved in cyclohexane was spin-coated thereon to form a silicone acrylate resin layer having a thickness of 100 nm, a pencil hardness of 2 H and a heat distortion temperature (ASTM D648) of 120° C. under a load of 4.6 kg/cm². Then, a gold film having a thickness of 50 nm was formed by sputtering to form a light reflective layer 3. Further, an ultraviolet curable resin was spin-coated on this light reflective layer 3 and cured by irradiation with ultraviolet rays to form a protective layer 4 having a thickness of 10 μm. After curing, this protective layer 4 had a Rockwell hardness (ASTM D785) of M90, a heat distortion temperature (ASTM D648) was 135° C. under a load of 4.6 kg/cm².

To the optical disc thus obtained, a semiconductor laser beam having wavelength of 780 nm was irradiated at a linear speed of 1.2 m/sec with a recording power of 7.5 mW to record EFM signals. Then, this optical disc was played back by the same CD player as used in Example 1, whereby the reflectance of the semiconductor laser beam was 74%, $I_{11}/I_{top}$ was 0.62, $I_3/I_{top}$ was 0.31, and the block error rate BLER was $4.0 \times 10^{-3}$.

Further, the protective layer 4 and the light reflective layer 3 of the optical disc after recording were peeled off, and the light absorptive layer 2 was washed off with a solvent, and the surface of the inter-layer 6 was inspected to confirm the formation of pits 5.

EXAMPLE 10

An optical disc was prepared in the same manner as in Example 9 except that in this Example 10, a silicone coating agent was spin-coated on the inter-layer 6 to form a silicate layer having a thickness of 0.01 μm, and the light absorptive layer 2 was formed thereon.

To the optical disc thus obtained, EFM signals were recorded with a recording power of 7.8 mW in the same manner as in Example 9. Then, this optical disc was played back by the same CD player as used in Example 9, whereby the reflectance of the semiconductor laser beam was 73%, $I_{11}/I_{top}$ was 0.62, $I_3/I_{top}$ was 0.31, and the block error rate BLER was $3.4 \times 10^{-3}$. Further, the surface of the inter-layer 6 of the optical disc after recording was inspected in the same manner as in Example 9, to confirm the formation of pits 5.

EXAMPLE 11

An optical disc was prepared in the same manner as in Example 9 except that in this Example 11, a glass substrate was used as the substrate 1, and an isocyanate resin dissolved with a solvent mixture of toluene and methyl ethyl ketone in a ratio of 1:1, was spin-coated on the reflective layer to form a binding layer having a thickness of 20 nm.

To the optical disc thus obtained, EFM signals were recorded with a recording power of 7.2 mW in the same manner as in Example 9. Then, this optical disc was played back by the same CD player as used in Example 9, whereby the reflectance of the semiconductor laser beam was 72%, $I_{11}/I_{top}$ was 0.65, $I_3/I_{top}$ was 0.33, and the block error rate BLER was $3.6 \times 10^{-3}$. Further, the surface of the inter-layer 6 of the optical disc after recording was inspected in the same manner as in Example 9, to confirm the formation of pits 5.

EXAMPLE 12

An optical disc was prepared in the same manner as in Example 9 except that in this Example 12, a silicone coating agent was spin-coated on the inter-layer 6 to form a silicate layer having a thickness of 0.01 μm, and the light absorptive layer 2 was formed thereon, and polybutadiene was spin-coated on the reflective layer to form a binding layer having a thickness of 20 nm.

To the optical disc thus obtained, EFM signals were recorded with a recording power of 7.2 mW in the same manner as in Example 9. Then, this optical disc was played back by the same CD player as in Example 9, whereby the reflectance of the semiconductor laser beam was 72%, $I_{11}/I_{top}$ was 0.66, $I_3/I_{top}$ was 0.35, and the block error rate BLER was $3.5 \times 10^{-3}$. Further, the surface of the inter-layer 6 of the optical disc after recording was inspected in the same manner as in Example 9, to confirm the formation of pits 5.

EXAMPLE 13

An optical disc was prepared in the same manner as in Example 9 except that in this Example 13, the thickness of the inter-layer 6 was changed to 20 nm, no silicone acrylate resin layer was provided, and a film of an alloy of iridium and gold in a ratio of 1:9 was formed by sputtering as the reflective layer 3. The alloy layer had a pencil hardness of 2 H.

To the optical disc thus obtained, EFM signals were recorded with a recording power of 7.0 mW in the same manner as in Example 9. Then, this optical disc was played back by the same CD player as used in Example 9, whereby the reflectance of the semiconductor laser beam was 71%, $I_{11}/I_{top}$ was 0.63, $I_3/I_{top}$ was 0.32, and the block error rate BLER was $3.3 \times 10^{-3}$. Further, the surface of the inter-layer 6 of the optical disc after recording was inspected in the same manner as in Example 9, to confirm the formation of pits 5. The pits 5 reached to the surface of the substrate since the thickness of the inter-layer 6 was thin.

The layered structure of this optical disc is diagrammatically illustrated in FIG. 6, and the same structure after optical recording is diagrammatically illustrated in FIG. 7.

EXAMPLE 14

An optical disc was prepared in the same manner as in Example 9 except that in this Example 14, a silicone coating agent was spin-coated on the inter-layer 6 to form a silicate layer having a thickness of 0.01 μm, the light absorptive layer 2 was formed thereon, no silicone acrylate resin layer was formed, and a film of an alloy of iridium and gold in a ratio of 1:9 was formed by sputtering as the reflective layer 3.

To the optical disc thus obtained, EFM signals were recorded with a recording power of 7.8 mW in the same manner as in Example 9. Then, this optical disc was played back by the same CD player as used in Example 9, whereby the reflectance of the semiconductor laser beam was 71%, $I_{11}/I_{top}$ was 0.64, $I_3/I_{top}$ was 0.32, and the block error rate BLER was $2.8 \times 10^{-3}$. Further, the surface of the inter-layer 6 of the optical disc after recording was inspected in the same manner as in Example 9, to confirm the formation of pits 5.

EXAMPLE 15

An optical disc was prepared in the same manner as in Example 9 except that in this Example 15, no silicone acrylate resin layer was formed, a film of an alloy of iridium and gold in a ratio of 1:9 was formed by sputtering as the reflective layer 3, and polyisoprene was spin-coated on the light reflective layer to form a binding layer having a thickness of 20 nm and the protective layer 4 of an ultraviolet curable resin was formed thereon.

To the optical disc thus obtained, EFM signals were recorded with a recording power of 7.4 mW in the same manner as in Example 9. Then, this optical disc was played back by the same CD player as used in Example 9, whereby the reflectance of the semiconductor laser beam was 72%, $I_{11}/I_{top}$ was 0.64, $I_3/I_{top}$ was 0.32, and the block error rate BLER was $4.1 \times 10^{-3}$. Further, the surface of the inter-layer 6 of the optical disc after recording was inspected in the same manner as in Example 9, to confirm the formation of pits 5.

EXAMPLE 16

An optical disc was prepared in the same manner as in Example 9 except that in this Example 16, no silicone acrylate resin layer was formed, a copper film having a thickness of 50 nm was formed as the reflective layer 3, and a bisphenol curable type epoxy resin diluted in a diglycidyl ether solvent was spin-coated to form an epoxy resin layer having a thickness of 10 μm as the protective layer 4. The protective layer had a Rockwell hardness (ASTM D785) of M110 and thus had a function as a hard layer.

To the optical disc thus obtained, EFM signals were recorded with a recording power of 7.0 mW in the same manner as in Example 9. Then, this optical disc was played back by the same CD player as used in Example 9, whereby the reflectance of the semiconductor laser beam was 75%, $I_{11}/I_{top}$ was 0.64, $I_3/I_{top}$ was 0.33, and the block error rate BLER was $2.9 \times 10^{-3}$. Further, the surface of the inter-layer 6 of the optical disc after recording was inspected in the same manner as in Example 9, to confirm the formation of pits 5.

EXAMPLE 17

An optical disc was prepared in the same manner as in Example 9 except that in this Example 17, a silicone coating agent was spin-coated on the inter-layer 6 to form a silicate layer having a thickness of 0.01 μm, the light absorptive layer 2 was formed thereon, no silicone acrylate resin layer was formed, a copper film having a thickness of 50 nm was formed as the light reflective layer 3, and a bisphenol curable type epoxy resin diluted with a diglycidyl ether solvent was spin-coated to form an epoxy resin layer having a thickness of 10 μm as the protective layer 4.

To the optical disc thus obtained, EFM signals were recorded with a recording power of 7.0 mW in the same manner as in Example 9. Then, this optical disc was played back by the same CD player as used in Example 9, whereby the reflectance of the semiconductor laser beam was 74%, $I_{11}/I_{top}$ was 0.64, $I_3/I_{top}$ was 0.33, and the block error rate BLER was $3.5 \times 10^{-3}$. Further, the surface of the inter-layer 6 of the optical disc after recording was inspected in the same manner as in Example 9, to confirm the formation of pits 5.

EXAMPLE 18

An optical disc was prepared in the same manner as in Example 9 except that in this Example 18, no silicone acrylate layer was formed, a copper film having a thickness of 50 nm was formed by vacuum vapor deposition as the light reflective layer 3, a polyvinyl acetate resin dissolved with a solvent mixture of toluene and methyl ethyl ketone in a ratio of 6:4, was spin-coated on the light reflective layer to form a binding layer having a thickness of 20 nm, the protective layer 4 was formed thereon, and a bisphenol curable type epoxy resin diluted with a diglycidyl ether solvent was spin-coated to form an epoxy resin layer having a thickness of 10 μm as the protective layer 4.

To the optical disc thus obtained, EFM signals were recorded with a recording power of 7.4 mW in the same manner as in Example 9. Then, this optical disc was played back by the same CD player as used in Example 9, whereby the reflectance of the semiconductor laser beam was 74%, $I_{11}/I_{top}$ was 0.64, $I_3/I_{top}$ was 0.33, and the block error rate BLER was $3.6 \times 10^{-3}$. Further, the surface of the inter-layer 6 of the optical disc after recording was inspected in the same manner as in Example 9, to confirm the formation of pits 5.

EXAMPLE 19

A polycarbonate disc (Panlite, tradename, manufactured by Tenjin Kasei K. K.) having a thickness of 1.2 mm, an outer diameter of 120 mm and an inner diameter of 15 mm and having a spiral pregroove 8 with a width of 0.8 μm, a depth of 0.08 μm and a pitch of 1.6 μm in a region covered by the diameter of from 46 to 117 mm of the disc, formed by injection molding, was used as the light transmitting substrate 1. This polycarbonate substrate 1 had a Rockwell hardness (ASTM D785) of M75 and a heat distortion temperature (ASTM D648) of 135° C. under a load of 4.6 kg/cm². As an organic dye to form the light absorptive layer 2, 0.65 g of 1,1′-dibutyl-3,3,3′,3′-tetramethyl-4,5,4′,5′-dibenzoindodicarbocyanine perchlorate (product number NK3219, manufactured by Nippon Kanko Shikiso K. K.) was dissolved in 10 ml of a diacetone alcohol solvent. This solution was coated by spin coating on the surface of the substrate 1 to form a light absorptive layer 2 having a thickness of 130 nm.

Then, a silver film having a thickness of 50 nm was formed by sputtering over the entire surface of a region covered by the diameter of from 45 to 118 mm of this disc, to form a light reflective layer 3. Further, on this light reflective layer 3, an ultraviolet curable resin was spin-coated and cured by irradiation with ultraviolet rays to form a protective layer 4 having a thickness of 10 μm. After the curing of the ultraviolet ray curable resin, this protective layer 4 had a Rockwell hardness (ASTM D785) of M90 and a heat distortion temperature (ASTM D648) of 150° C. under a load of 4.6 kg/cm².

To the optical disc thus obtained, a semiconductor laser beam having a wavelength of 780 nm was irradiated at a linear speed of 1.2 m/sec with a recording power of 6.0 mW to record EFM signals. Then, this optical disc was played back by a commercially available CD player (Aurex XR-V73, wavelength of the reading laser beam λ=780 nm), whereby $I_{11}/I_{top}$ obtained from the eye pattern of the read-out signals was 0.63, and $I_3/I_{top}$ was 0.32.

The CD standards prescribe that $I_{11}/I_{top}$ is at least 0.6, and $I_3/I_{top}$ is from 0.3 to 0.7. Thus, the optical disc of this example meets the standards.

Further, protective layer 4 and the light reflective layer 3 of the optical disc were peeled off after recording, and the surface of the light absorptive layer 2 was inspected, whereby linear fine irregularities were observed which appeared to represent the outline profile of pits. Further, the light absorptive layer 2 was washed off with a solvent, and the surface of the substrate 1 was inspected, whereby optically modified pits 5 in the form of protuberances were observed.

EXAMPLE 20

An optical disc was prepared in the same manner as in Example 19 except that in this Example 20, a polycarbonate disc (Iupilon, tradename, manufactured by Mitsubishi Gas Kagaku K. K.) having a thickness of 1.2 mm, and outer diameter of 120 mm, an inner diameter of 15 mm, a Rockwell hardness (ASTM D785) of M75 and a heat distortion temperature (ASTM D648) of 132° C. under a load of 4.6 kg/cm² and having a spiral prepit 8 for CD format signals formed with a width of 0.6 μm, a depth of 0.8 μm and a pitch of 1.6 μm in a range of the diameter of from 46 to 80 mm of the disc and a spiral pregroove 9 formed outside thereof with a width of 0.8 μm, a depth of 0.08 μm and a pitch of 1.6 μm in a range of the diameter of from 80 to 117 mm of the disc, which was formed by injection molding, was used as the light transmitting substrate 1, a gold film was used as the light reflective layer 3, and an epoxy resin layer having a thickness of 2 μm was formed by spin coating between this light reflective layer 3 and the protective layer 4 made of the ultraviolet curable resin. The epoxy resin layer had a Rockwell hardness (ASTM D785) of M90 and a heat distortion temperature (ASTM D648) of 140° C. under a load of 4.6 kg/cm². The inside range of the diameter of from 46 to 80 mm of this optical disc is a so-called ROM (read only memory) region, and the outside range of the diameter of from 80 to 117 mm is a recordable region.

To the recordable region of the optical disc thus obtained, EFM signals were recorded in the same manner as in Example 19. Then, this optical disc was played back by the commercially available CD player, whereby $I_{11}/I_{top}$ was 0.62, and $I_3/I_{top}$ was 0.32.

Further, the surface of the substrate 1 of the optical disc after recording was inspected in the same manner as in Example 19, to confirm the formation of optically modified pits 5 in the form of protuberances.

EXAMPLE 21

An optical disc was prepared in the same manner as in Example 19 except that in this Example 21, a polystyrene disc having a Rockwell hardness (ASTM D785) of M80 and a heat distortion temperature (ASTM D648)

of 89° C. under a load of 4.6 kg/cm², was used as the light transmitting substrate 1, the pregroove on the disc was subjected to webling of 22.11 kHz with an amplitude of 30 nm, a silicone acrylate resin layer having a thickness of 40 nm was formed by spin coating between the light absorptive layer 2 and the light reflective layer 3, and an epoxy resin layer having a thickness of 10 nm was formed by spin coating between this layer and the light absorptive layer, and a gold film was formed as the light reflective layer 3. The silicone acrylate resin layer had a Rockwell hardness (ASTM D785) of M100 and a heat distortion temperature (ASTM D648) of 200° C. under a load of 4.6 kg/cm².

To the optical disc thus obtained, EFM signals were recorded in the same manner as in Example 19. Then, this optical disc was played back by the commercially available CD player, whereby $I_{11}/I_{top}$ was 0.63, and $I_3/I_{top}$ was 0.33.

Further, the surface of the substrate 1 of the optical disc after recording was inspected in the same manner as in Example 19, to confirm the formation of optically modified pits 5 in the form of protuberances.

EXAMPLE 22

As the light transmitting substrate 1, the same polycarbonate disc as used in Example 19 was employed.

On this light transmitting substrate 1, an acrylate resin was spin-coated to form an inter-layer in a thickness of 70 nm. Then, as an organic dye to form the light absorptive layer 2, 0.65 g of 1,1'-dipropyl-3,3,3',3'-tetramethyl-5,5'-dimethoxyindodicarbocyanine iodide was dissolved in 10 ml of a diacetone alcohol solvent, and the solution was coated by spin coating on the inter-layer 6 on the substrate 1, to form a light absorptive layer 2 having a thickness of 90 nm. The inter-layer 6 had a heat deformation temperature (ASTM D648) of 100° C. under a load of 4.6 kg/cm² and a Rockwell hardness (ASTM D785) of M85.

Then, a silicone acrylate resin was formed by spin coating in a thickness of 50 nm on the above light absorptive layer 2. Then, a gold film having a thickness of 50 nm was formed by sputtering on the entire surface of a region of the diameter of from 45 to 118 mm of the disc, to form a light reflective layer 3. Further, an ultraviolet curable resin was spin-coated on this light reflective layer 3 and cured by irradiation with ultraviolet rays to form a protective layer 4 having a thickness of 10 μm.

To the optical disc thus obtained, a semicondcutor laser beam having a wavelength of 780 nm was irradiated at a linear speed of 1.2 m/sec with a recording power of 6.0 mW to record EFM signals. Then, this optical disc was played back by the commercially available CD player (Aurex XR-V73, wavelength of the reading laser beam λ=780 nm), whereby $I_{11}/I_{top}$ obtained from the eye pattern of the read-out signals, was 0.63, and $I_3/I_{top}$ was 0.32.

The CD standards prescribe that $I_{11}/I_{top}$ is at least 0.6, and $I_3/I_{top}$ is from 0.3 to 0.7. Thus, the optical disc of this example satisfies the standards.

Further, the protective layer 4, the light reflective layer 3 and the light absorptive layer 2 of this optical disc were peeled off after recording, and the surface of the inter-layer 6 was inspected, whereby formation of optically modified pits 5 in the form of protuberances was confirmed.

EXAMPLE 23

An optical disc was prepared in the same manner as in Example 22 except that in this Example 23, the inter-layer 6 was formed with a vinyl chloride copolymer having a heat distortion temperature (ASTM D648) of 80° C. under a load of 4.6 kg/cm² and a Rockwell hardness (ASTM D785) of M95, in a thickness of 60 nm.

To the optical disc thus obtained, EFM signals were recorded in the same manner as in Example 22. Then, this optical disc was played back by the commercially available CD player, whereby $I_{11}/I_{top}$ was 0.66, and $I_3/I_{top}$ was 0.35.

Further, the surface of the inter-layer 6 after recording was inspected in the same manner as in Example 22, to confirm the formation of optically modified pits 5 in the form of protuberances.

EXAMPLE 24

An optical disc was prepared in the same manner as in Example 22 except that in this Example 24, the inter-layer 6 was formed with an acrylate resin having a heat distortion temperature (ASTM D648) of 90° C. under a load of 4.6 kg/cm² and a Rockwell hardness (ASTM D785) of M100, the thickness of the light absorptive layer 2 was changed to 130 nm, no silicone acrylate resin layer was formed between the light absorptive layer 2 and the light reflective layer 3, and the light reflective layer 3 was formed with a film of an alloy of gold and iridium in a ratio of 9:1.

To the optical disc thus obtained, EFM signals were recorded in the same manner as in Example 22. Then, this optical disc was played back by the commercially available CD player, whereby $I_{11}/I_{top}$ was 0.63, and $I_3/I_{top}$ was 0.32.

Further, the surface of the inter-layer 6 after recording was inspected in the same manner as in Example 22, to confirm the formation of optically modified pits 5 in the form of protuberances.

EXAMPLE 25

An optical disc was prepared in the same manner as in Example 22 except that in this Example 25, the inter-layer 6 was formed with a vinylidene chloride copolymer having a heat distortion temperature (ASTM D648) of 66° C. under a load of 4.6 kg/cm² and a Rockwell hardness (ASTM D785) of M60, in a thickness of 60 nm.

To the optical disc thus obtained, EFM signals were recorded in the same manner as in Example 22. Then, this optical disc was played back by the commercially available CD player, whereby $I_{11}/I_{top}$ was 0.67, and $I_3/I_{top}$ was 0.36.

Further, the surface of the inter-layer 6 after recording was inspected in the same manner as in Example 22, to confirm the formation of optically modified pits 5 in the form of protuberances.

EXAMPLE 26

An optical disc was prepared in the same manner as in Example 22 except that in this Example 26, the inter-layer 6 was formed with polystyrene having a heat deformation temperature (ASTM D648) of 85° C. under a load of 4.6 kg/cm² and a Rockwell hardness (ASTM D785) of M70.

To the optical disc thus obtained, EFM signals were recorded in the same manner as in Example 22. Then, this optical disc was played back by the commercially available CD player, whereby $I_{11}/I_{top}$ was 0.65, and $I_3/I_{top}$ was 0.34.

Further, the surface of the inter-layer 6 after recording was inspected in the same manner as in Example 22, to confirm the formation of optically modified pits 5 in the form of protuberances.

EXAMPLE 27

An optical disc was prepared in the same manner as in Example 22 except that in this Example 27, the inter-layer 6 was formed with a polyvinyl acetate having a heat distortion temperature (ASTM D648) of 55° C. under a load of 4.6 kg/cm² and a Rockwell hardness (ASTM D785) of M70 in a thickness of 60 nm, and isocyanate was spin-coated on the silicone acrylate resin layer in a thickness of 10 nm.

To the optical disc thus obtained, EFM signals were recorded in the same manner as in Example 22. Then, this optical disc was played back by the commercially available CD player, whereby $I_{11}/I_{top}$ was 0.66, and $I_3/I_{top}$ was 0.32.

Further, the surface of the inter-layer 6 after recording was inspected in the same manner as in Example 22, to confirm the formation of optically modified pits 5 in the form of protuberances.

EXAMPLE 28

An optical disc was prepared in the same manner as in Example 22 except that in this Example 28, the inter-layer 6 was formed with a polyester having a heat distortion temperature (ASTM D648) of 70° C. under a load of 4.6 kg/cm² and a Rockwell hardness (ASTM D785) of M70, as the organic dye to form the light absorptive layer 2, 1,1'-dibutyl-3,3,3',3'-tetramethyl-4,5,4',5'-dibenzoindodicarbocyanine perchlorate was used, a silicone resin was coated on the light absorptive layer 2 instead of the silicone acrylate resin, and a bisphenol curable type epoxy resin layer was formed on the light reflective layer 3 in a thickness of 20 nm.

To the optical disc thus obtained, EFM signals were recorded in the same manner as in Example 22. Then, this optical disc was played back by the commercially available CD player, whereby $I_{11}/I_{top}$ was 0.61, and $I_3/I_{top}$ was 0.31.

Further, the surface of the inter-layer 6 after recording was inspected in the same manner as in Example 22, to confirm the formation of optically modified pits 5 in the form of protuberances.

EXAMPLE 29

An optical disc was prepared in the same manner as in Example 22 except that in this Example 29, the inter-layer 6 was formed with a polyurethane resin having a heat distortion temperature (ASTM D648) of 50° C. under a load of 4.6 kg/cm² and a Rockwell hardness (ASTM D785) of M60 in a thickness of 50 nm, a silicone resin was spin-coated on this inter-layer 6 in a thickness of 15 nm for solvent resistant treatment, then a light absorptive layer 2 having a thickness of 130 nm was formed by using 1,1'-dibutyl-3,3,3',3'-tetramethyl-4,5,4',5'-dibenzoindodicarbocyanine perchlorate, no silicone acrylate resin was coated between the light absorptive layer 2 and the light reflective layer 3, and the light reflective layer 3 was formed with a film of an alloy of gold and iridium in a ratio of 9:1.

To the optical disc thus prepared, EFM signals were recorded in the same manner as in Example 22. Then, this optical disc was played back by the commercially available CD player, whereby $I_{11}/I_{top}$ was 0.66, and $I_3/I_{top}$ was 0.33.

Further, the surface of the inter-layer 6 after recording was inspected in the same manner as in Example 22, to confirm the formation of optically modified pits 5 in the form of protuberances.

EXAMPLE 30

An optical disc was prepared in the same manner as in Example 22 except that in this Example 30, the inter-layer 6 was formed with a polyurethane resin having a heat distortion temperature (ASTM D648) of 50° C. under a load of 4.6 kg/cm² and a Rockwell hardness (ASTM D785) of M60, a silicone coating agent was spin-coated on this inter-layer 6 in a thickness of 15 nm for solvent resistant treatment, and then a light absorptive layer 2 was formed by using 1,1'-dibutyl-3,3,3',3'-tetramethyl-4,5,4',5'-dibenzoindodicarbocyanine perchlorate, and a silicone resin was formed on this light absorptive layer 2 instead of the silicone acrylate resin, a polysulfide-incorporated epoxy resin was coated on the light reflective layer 3 in a thickness of 20 nm, and the protective layer 4 was formed thereon.

To the optical disc thus obtained, EFM signals were recorded in the same manner as in Example 22. Then, this optical disc was played back by the commercially available CD player, whereby $I_{11}/I_{top}$ was 0.66, and $I_3/I_{top}$ was 0.33.

Further, the surface of the inter-layer 6 after recording was inspected in the same manner as in Example 22, to confirm the formation of optically modified pits 5 in the form of protuberances.

EXAMPLE 31

An optical disc was prepared in the same manner as in Example 22 except that in this Example 31, the inter-layer 6 was formed with a cellulose resin having a heat distortion temperature (ASTM D648) of 60° C. under a load of 4.6 kg/cm² and a Rockwell hardness (ASTM D785) of M100, as an organic dye to form the light absorptive layer 2, 1,1'-dibutyl-3,3,3',3'-tetramethyl-4,5,4',5'-dibenzoindodicarbocyanine perchlorate was employed, and a silicone resin was coated on the light absorptive layer 2 instead of the silicone acrylate resin.

To the optical disc thus obtained, EFM signals were recorded in the same manner as in Example 22. Then, this optical disc was played back by the commercially available CD player, whereby $I_{11}/I_{top}$ was 0.65, and $I_3/I_{top}$ was 0.32.

Further, the surface of the inter-layer 6 after recording was inspected in the same manner as in Example 22, to confirm the formation of optically modified pits 5 in the form of protuberances.

EXAMPLE 32

An optical disc was prepared in the same manner as in Example 22 except that in this Example 32, the inter-layer 6 was formed with an urethane thermoplastic resin having a heat distortion temperature (ASTM D648) of 50° C. under a load of 4.6 kg/cm² and a Rockwell hardness (ASTM D785) of M30 in a thickness of 50 nm, a silicone coating agent was spin-coated on this inter-layer 6 in a thickness of 15 nm for solvent resistant treatment, and then a light absorptive layer 2 was formed by using 1,1'-dibutyl-3,3,3',3'-tetramethyl-4,5,4',5'-dibenzoindodicarbocyanine perchlorate, and a silicone resin was coated instead of the silicone acrylate resin.

To the optical disc thus obtained, EFM signals were recorded in the same manner as in Example 22. Then, this optical disc was played back by the commercially available CD player, whereby $I_{11}/I_{top}$ was 0.67, and $I_3/I_{top}$ was 0.34.

Further, the surface of the inter-layer 6 after recording was inspected in the same manner as in Example 22, to confirm the formation of optically modified pits 5 in the form of protuberances.

EXAMPLE 33

An optical disc was prepared in the same manner as in Example 22 except that in this Example 33, the inter-layer 6 was formed with an acrylic resin having a heat distortion temperature (ASTM D648) of 70° C. under a load of 4.6 kg/cm$^2$ and a Rockwell hardness (ASTM D785) of M90, a light absorptive layer 2 having a thickness of 130 nm was formed by using 1,1'-dipropyl-5,7,5',7'-dimethoxyindodicarbocyanine fluoroborate as an organic dye, the light reflective layer 3 was formed by a copper film, and the protective layer 4 was formed with a silicone hard coating agent in a thickness of 5 μm.

To the optical disc thus obtained, EFM signals were recorded in the same manner as in Example 22. Then, this optical disc was played back by the commercially available CD player, whereby $I_{11}/I_{top}$ was 0.63, and $I_3/I_{top}$ was 0.32.

Further, the surface of the inter-layer 6 after recording was inspected in the same manner as in Example 22, to confirm the formation of optically modified pits 5 in the form of protuberances.

EXAMPLE 34

An optical disc was prepared in the same manner as in Example 22 except that in this Example 34, the inter-layer 6 was formed with a polyurethane resin having a heat distortion temperature (ASTM D648) of 50° C. under a load of 4.6 kg/cm$^2$ and a Rockwell hardness (ASTM D785) of M60, 1,1'-dipropyl-5,7,5',7'-dimethoxyindodicarbocyanine fluoroborate was used as an organic dye for the light absorptive layer 2, a SiO$_2$ film having a thickness of 30 nm was formed on the light absorptive layer 2 by sputtering, the light reflective layer 3 was formed with a copper film, an epoxy resin was spin-coated on the light reflective layer 3 in a thickness of 20 nm, and the protective layer 4 was formed thereon with a silicone hard coating agent in a thickness of 5 μm.

To the optical disc thus obtained, EFM signals were recorded in the same manner as in Example 22. Then, this optical disc was played back by the commercially available CD player, whereby $I_{11}/I_{top}$ was 0.66, and $I_3/I_{top}$ was 0.33.

Further, the surface of the inter-layer 6 after recording was inspected in the same manner as in Example 22, to confirm the formation of optically modified pits 5 in the form of protuberances.

EXAMPLE 35

An optical disc was prepared in the same manner as in Example 22 except that in this Example 35, a glass disc was used as the light transmitting substrate 1, the inter-layer 6 was formed with an acrylate resin having a heat distortion temperature (ASTM D648) of 70° C. under a load of 4.6 kg/cm$^2$ and a Rockwell hardness (ASTM D785) of M90 and having a pregroove formed by a photo polymerization method, a light absorptive layer 2 having a thickness of 130 nm was formed by using 1,1'-dipropyl-5,7,5',7'-dimethoxyindodicarbocyanine fluoroborate as an organic dye to form the light absorptive layer 2, the light reflective layer 3 was formed by a copper film, and the protective layer 4 was formed with a silicone hard coating agent in a thickness of 5 μm.

To the optical disc thus obtained, EFM signals were recorded in the same manner as in Example 22. Then, this optical disc was played back by the commercially available CD player, whereby $I_{11}/I_{top}$ was 0.63, and $I_3/I_{top}$ was 0.32.

Further, the surface of the inter-layer 6 after recording was inspected in the same manner as in Example 22, to confirm the formation of optically modified pits 5 in the form of protuberances.

COMPARATIVE EXAMPLE 1

An optical disc was prepared in the same manner as in Example 22 except that in this Comparative Example 1, the inter-layer 6 was formed with a silicone resin having a heat distortion temperature (ASTM D648) of 180° C. under a load of 4.6 kg/cm$^2$ and a Rockwell hardness (ASTM D785) of M100.

To the optical disc thus obtained, EFM signals were recorded in the same manner as in Example 22. Then, this optical disc was played back by the commercially available CD player, whereby $I_{11}/I_{top}$ was 0.28, and $I_3/I_{top}$ was 0.05.

Thus, this disc does not satisfy the CD format.

EXAMPLE 36

A polycarbonate substrate 1 of a disc shape having a thickness of 1.2 mm, an outer diameter of 120 mm and an inner diameter of 15 mm and having a spiral pregroove formed with a width of 0.8 μm, a depth of 0.08 μm and a pitch of 1.6 μm in a range of the diameter of from 46 to 117 mm of the disc, was formed by injection molding. This polycarbonate substrate 1 had a Rockwell hardness (ASTM D785) of M75 and a heat distortion temperature (ASTM D648) of 132° C.

As an organic dye to form the light absorptive layer, 0.65 g of 1,1'-dibutyl-3,3,3',3'-tetramethyl-4,5,4',5'-dibenzoindodicarbocyanine perchlorate (product number NK3219, manufactured by Nippon Kanko Shikiso K. K.) was dissolved in 10 ml of a diacetone alcohol solvent. The solution was coated on the surface of the substrate 1 by spin coating to form a light absorptive layer 2 having a thickness of 130 nm.

Then, a gold film having a thickness of 50 nm was formed by sputtering on the entire surface in a region of the diameter of from 45 to 118 nm of this disc, to form a light reflective layer 3. Further, an ultraviolet curable resin was spin-coated on this light reflective layer 3 and cured by irradiation with ultraviolet rays, to form a protective layer 4 having a thickness of 10 μm. After curing, this protective layer had a Rockwell hardness (ASTM D785) of M90 and a heat distortion temperature (ASTM D648) of 150° C.

To the recordable region 7 of the optical disc thus obtained, a semiconductor laser beam having a wavelength of 780 nm was irradiated at a linear speed of 1.2 m/sec with a recording power of 6.0 mW to record EFM signals. Then, this optical disc was played back by a commercially available CD player (Aurex XR-V73, wavelength of the reading laser beam $\lambda = 780$ nm), whereby the reflectance of the semiconductor laser beam was 72%, $I_{11}/I_{top}$ was 0.65, and $I_3/I_{top}$ was 0.35, and the block error rate BLER was $3.4 \times 10^{-3}$.

The CD standards prescribe that the reflectance is at least 70%, $I_{11}/I_{top}$ is at least 0.6, $I_3/I_{top}$ is from 0.3 to 0.7, and the block error rate BLER is not higher than $3\times 10^{-2}$. The optical disc of this reference meets the standards.

Further, the protective layer 4 and the light reflective layer 4 of the optical disc were peeled off after recording, and the light absorptive layer 2 was washed off with a solvent, and the surface of the light transmitting substrate 1 was observed by STM (Scanning Tunneling Microscope), whereby deformation in the form of protuberances was observed at the pitted portion. Further, the recorded portion and the non-recorded portion of the substrate 1 were measured by a spectro photometer, whereby at the recorded portion, peaks other than the peaks of the resin observed at the non-recorded portion, were observed.

This example illustrates the case where the protective layer 4 was utilized as a hard layer.

EXAMPLE 37

On a polycarbonate substrate (Panlite, manufactured by Teijin Kagaku) having the same shape and pregroove as in Example 36, a light absorptive layer 2 was formed in the same manner as described above, a silicone acrylate layer having a thickness of 50 nm was formed thereon as a hard layer 6, a silver layer having a thickness of 50 nm was formed thereon by vacuum vapor deposition as a light reflective layer 3, and the same protective layer 4 as in Example 36 was formed thereon. The above substrate had a Rockwell hardness (ASTM D785) of M75 and a heat distortion temperature (ASTM D648) of 135° C. Whereas, the above hard layer 6 had a Rockwell hardness (ASTM D785) of M100 and a heat distortion temperature (ASTM D648) of 200° C.

To this optical disc, data were recorded in the same manner as in Example 36, and then reproduced, whereby the reflectance of the semiconductor laser beam was 71%, $I_{11}/I_{top}$ was 0.63, $I_3/I_{top}$ was 0.33, and the block error rate BLER was $3.5\times 10^{-3}$.

Further, the surface of the light transmitting substrate 1 of the optical disc after recording was inspected by STM (Scanning Tunneling Microscope) in the same manner as in Example 36, whereby deformation in the form of protuberances was observed at the pitted portion. The center portion of this deformation was slightly low, and the deformation 6 was found to have two peaks, as illustrated in FIG. 15(b).

EXAMPLE 38

On a polycarbonate substrate (Iupilon, manufactured by Mitsubishi Gas Kagaku) having the same shape and pregroove as in Example 36, a light absorptive layer 2 was formed in the same manner as above, an epoxy resin layer having a thickness of 50 nm was formed thereon as a hard layer 6, a gold film having a thickness of 50 nm was formed by vacuum vapor deposition thereon as a light reflective layer 3, and the same protective layer 4 as in Example 36 was formed thereon. The substrate had a Rockwell hardness (ASTM D785) of M75 and a heat distortion temperature (ASTM D648) of 132° C. Whereas, the above hard layer 6 had a Rockwell hardness (ASTM D785) of M90 and a heat distortion temperature (ASTM D648) of 140° C.

To this optical disc, data were recorded in the same manner as in Example 36 and then reproduced, whereby the reflectance of the semiconductor laser beam was 72%, $I_{11}/I_{top}$ was 0.62, $I_3/I_{top}$ was 0.32, and the block error rate BLER was $2.4\times 10^{-3}$.

EXAMPLE 39

On a polystyrene substrate having the same shape and pregroove as in Example 36, a light absorptive layer 2 was formed in the same manner as above, an acrylate resin layer having a thickness of 50 nm was formed thereon as a hard layer 6, an epoxy resin was spin-coated thereon to improve the bonding properties, then a gold film having a thickness of 50 nm was formed by vacuum vapor deposition as the light reflective layer 3, and the same protective layer 4 as in Example 36 was formed thereon. The substrate had a Rockwell hardness (ASTM D785) of M80 and a heat distortion temperature (ASTM D648) of 89° C. Whereas, the above hard layer 6 had a Rockwell hardness (ASTM D785) of M100 and a heat distortion temperature (ASTM D648) of 100° C.

To this optical disc, data were recorded in the same manner as in Example 36 and then reproduced, whereby the reflectance of the semiconductor laser beam was 72%, $I_{11}/I_{top}$ was 0.62, $I_3/I_{top}$ was 0.31, and the block error rate BLER was $7.0\times 10^{-3}$.

EXAMPLE 40

On a polymethyl methacrylate substrate having the same shape and pregroove as in Example 36, a light absorptive layer 2 was formed in the same manner as described above, then a polyester resin layer having a thickness of 50 nm was formed thereon as a hard layer 6, a gold layer having a thickness of 50 nm was formed thereon as a light reflective layer 3 by vacuum vapor deposition, an epoxy resin was further spin-coated thereon to improve the bonding properties, and then the same protective layer 4 as in Example 36 was formed. The substrate had a Rockwell hardness (ASTM D785) of M100 and a heat distortion temperature (ASTM D648) of 110° C. Whereas, the above hard layer 6 had a Rockwell hardness (ASTM D785) of M110 and a heat distortion temperature (ASTM D648) of 115° C.

To this optical disc, data were recorded in the same manner as in Example 36 and then reproduced, whereby the reflectance of the semiconductor laser beam was 72%, $I_{11}/I_{top}$ was 0.64, $I_3/I_{top}$ was 0.34, and the block error rate BLER was $8.0\times 10^{-3}$.

EXAMPLE 41

On a polyolefin substrate having the same shape and pregroove as in Example 36, a light absorptive layer 2 was formed in the same manner as in Example 36 by using 1,1'-dibutyl-3,3,3',3'-tetramethyl-5,5'-diethoxyindodicarbocyanine perchlorate, then a silicone acrylate resin layer having a thickness of 50 nm was formed thereon as the hard layer 6, and a gold film having a thickness of 50 nm was formed thereon as the light reflective layer 3 by vacuum vapor deposition, an epoxy resin was spin-coated thereon to improve the bonding properties, and then the same protective layer 4 as in Example 36 was formed. The substrate had a Rockwell hardness (ASTM D785) of M75 and a heat distortion temperature (ASTM D648) of 140° C. Whereas, the above hard layer 6 had a Rockwell hardness (ASTM D785) of M100 and a heat distortion temperature (ASTM D648) of 200° C.

To this optical disc, data were recorded in the same manner as in Example 36 and then reproduced, whereby the reflectance of the semiconductor laser beam was 74%, $I_{11}/I_{top}$ was 0.61, $I_3/I_{top}$ was 0.33, and the block error rate BLER was $2.3 \times 10^{-3}$.

EXAMPLE 42

On an epoxy resin substrate having the same shape and pregroove as in Example 36, a light absorptive layer 2 was formed in the same manner as in Example 36 by using 1,1'-dibutyl-3,3,3',3'-tetramethyl-5,5'-diethoxyindodicarbocyanine perchlorate, and a silicone resin layer having a thickness of 50 nm was formed thereon as the hard layer 6, an aluminum film having a thickness of 50 nm was formed thereon as the light reflective layer 3 by vacuum vapor deposition, and the same protective layer 4 as in Example 36 was formed thereon. The substrate had a Rockwell hardness (ASTM D785) of M90 and a heat distortion temperature (ASTM D648) of 135° C. Whereas, the above hard layer 6 had a Rockwell hardness (ASTM D785) of M100 and a heat distortion temperature (ASTM D648) of 180° C.

To this optical disc, data were recorded in the same manner as in Example 36 and then reproduced, whereby the reflectance of the semiconductor laser beam was 73%, $I_{11}/I_{top}$ was 0.61, $I_3/I_{top}$ was 0.30, and the block error rate BLER was $2.0 \times 10^{-3}$.

EXAMPLE 43

On a polycarbonate substrate (Panlite, manufactured by Teijin Kagaku) having the same shape and pregroove as in Example 36, a light absorptive layer 2 was formed in the same manner as described above, a silver film having a thickness of 50 nm was formed thereon as the light reflective layer 3 by vacuum vapor deposition, a silicone acrylate layer having a thickness of 50 nm was formed thereon as the hard layer 6, and the same protective layer 4 as in Example 36 was formed thereon. The substrate had a Rockwell hardness (ASTM D785) of M75 and a heat distortion temperature (ASTM D648) of 135° C. Whereas, the above hard layer 6 had a Rockwell hardness (ASTM D785) of M100 and a heat distortion temperature (ASTM D648) of 200° C.

To this optical disc, data were recorded in the same manner as in Example 36 and then reproduced, whereby the reflectance of the semiconductor laser beam was 71%, $I_{11}/I_{top}$ was 0.64, $I_3/I_{top}$ was 0.34, and the block error rate BLER was $3.7 \times 10^{-3}$.

EXAMPLE 44

On a polycarbonate substrate (Iupilon, manufactured by Mitsubishi Gas Kagaku) having the same shape and pregroove as in Example 36, a light absorptive layer 2 was formed in the same manner as described above, a gold film having a thickness of 50 nm was formed thereon as the light reflective layer 3 by vacuum vapor deposition, and an epoxy resin layer having a thickness of 50 nm was formed thereon as the hard layer 6 which also served as a protective layer. The substrate had a Rockwell hardness (ASTM D785) of M75 and a heat deformation temperature (ASTM D648) of 135° C. Whereas, the above hard layer 6 had a Rockwell hardness (ASTM D785) of M90 and a heat distortion temperature (ASTM D648) of 140° C.

To this optical disc, data were recorded in the same manner as in Example 36 and then reproduced, whereby the reflectance of the semiconductor laser beam was 72%, $I_{11}/I_{top}$ was 0.63, $I_3/I_{top}$ was 0.33, and the block error rate BLER was $2.7 \times 10^{-3}$.

EXAMPLE 45

On a polystyrene substrate having the same shape and pregroove as in Example 36, a light absorptive layer 2 was formed in the same manner as described above, a gold film having a thickness of 50 nm was formed thereon as the light reflective layer 3 by vacuum vapor deposition, and an acrylate resin layer having a thickness of 50 nm was formed thereon as the hard layer 6 which served also as a protective layer. The substrate had a Rockwell hardness (ASTM D785) of M80 and a heat deformation temperature (ASTM D648) of 89° C. Whereas, the above hard layer 6 had a Rockwell hardness (ASTM D785) of M100 and a heat distortion temperature (ASTM D648) of 100° C.

To this optical disc, data were recorded in the same manner as in Example 36 and then reproduced, whereby the reflectance of the semiconductor laser beam was 72%, $I_{11}/I_{top}$ was 0.63, $I_3/I_{top}$ was 0.32, and the block error rate BLER was $7.1 \times 10^{-3}$.

EXAMPLE 46

On a polymethyl methacrylate substrate having the same shape and pregroove as in Example 36, a light absorptive layer 2 was formed in the same manner as described above, then, a gold film having a thickness of 50 nm was formed thereon as the light reflective layer 3 by vacuum vapor deposition, and an epoxy resin was spin-coated thereon to improve the bonding properties, and a polyester resin layer having a thickness of 50 nm was formed as the hard layer 6 which served also as a protective layer. The substrate had a Rockwell hardness (ASTM D785) of M100 and a heat deformation temperature (ASTM D648) of 110° C. Whereas, the above hard layer 6 had a Rockwell hardness (ASTM D785) of M110 and a heat distortion temperature (ASTM D648) of 115° C.

To this optical disc, data were recorded in the same manner as in Example 36 and then reproduced, whereby the reflectance of the semiconductor laser beam was 72%, $I_{11}/I_{top}$ was 0.65, $I_3/I_{top}$ was 0.34, and the block error rate BLER was $8.3 \times 10^{-3}$.

EXAMPLE 47

On a polyolefin substrate having the same shape and pregroove as in Example 36, a light absorptive layer 2 was formed in the same manner as in Example 36 by using 1,1'-dibutyl-3,3,3',3'-tetramethyl-5,5'-diethoxyindodicarbocyanine perchlorate, then a gold film having a thickness of 50 nm was formed thereon as the light reflective layer 3 by vacuum vapor deposition, an epoxy resin was spin-coated thereon to improve the bonding properties, and a silicone acrylate resin layer having a thickness of 50 nm was formed thereon as the hard layer 6 which served also as a protective layer. The substrate had a Rockwell hardness (ASTM D785) of M75 and a heat distortion temperature (ASTM D648) of 140° C. Whereas, the above hard layer 6 had a Rockwell hardness (ASTM D785) of M100 and a heat distortion temperature (ASTM D648) of 200° C.

To this optical disc, data were recorded in the same manner as in Example 36 and then reproduced, whereby the reflectance of the semiconductor laser beam was 71%, $I_{11}/I_{top}$ was 0.62, $I_3/I_{top}$ was 0.34, and the block error rate BLER was $2.4 \times 10^{-3}$.

EXAMPLE 48

On an epoxy resin substrate having the same shape and pregroove as in Example 36, a light absorptive layer 2 was formed in the same manner as in Example 36 by using 1,1′-dibutyl-3,3,3′,3′-tetramethyl-5,5′-diethoxyindodicarbocyanine perchlorate, then an aluminum film having a thickness of 50 nm was formed thereon as the light reflective layer 3 by vacuum vapor deposition, and a silicone resin layer having a thickness of 50 nm was formed as the hard layer 6 which served also as a protective layer. The substrate had a Rockwell hardness (ASTM D785) of M90 and a heat distortion temperature (ASTM D648) of 135° C. Whereas, the above hard layer 6 had a Rockwell hardness (ASTM D785) of M100 and a heat distortion temperature (ASTM D648) of 180° C.

To this optical disc, data were recorded in the same manner as in Example 36 and then reproduced, whereby the reflectance of the semiconductor laser beam was 72%, $I_{11}/I_{top}$ was 0.62, $I_3/I_{top}$ was 0.32, and the block error rate BLER was $2.1 \times 10^{-3}$.

COMPARATIVE EXAMPLE 2

An optical disc was prepared in the same manner as in Example 36 except that in this Comparative Example 2, the protective layer 4 made of the ultraviolet curable resin was formed to have a Rockwell hardness (ASTM D785) of M60 and a heat distortion temperature (ASTM D648) of 90° C. under a load of 4.6 kg/cm² after curing.

To this optical disc, a semiconductor laser beam having a wavelength of 780 nm was irradiated at a linear speed of 1.2 m/sec to record EFM signals in the same manner as in Example 36, whereby no adequately distinct pits were observed on the substrate 1. Then, this optical disc was played back by the same CD player as used in Example 36, whereby the reflectance of the optical disc was 71%, $I_{11}/I_{top}$ was 0.7, $I_3/I_{top}$ was 0.37, but the block error rate BLER was $1.5 \times 10^{-1}$ and thus failed to meet the CD standards.

As described in the foregoing, according to the optical information recording medium of the present invention, it is possible to form pits optically similar to CD by irradiation with a laser beam, and at the same time, the reflective layer is provided behind the light absorptive layer in close contact therewith, whereby it is possible to take a layered structure similar to CD. Thus, according to the present invention, a recordable optical information recording medium which meets the CD format, can readily be obtained.

What is claimed is:

1. An optical information recording medium comprising:
   a light transmitting substrate;
   a light absorptive layer overlaying the substrate to absorb a laser beam; and
   a light reflective layer overlaying the light absorptive layer,
   wherein said substrate has a surface layer, adjacent to the light absorptive layer, which is deformable by energy generated upon absorption of the laser beam by the light absorptive layer, to form optically readable pits.

2. The optical information recording medium according to claim 1, wherein the light transmitting substrate has a heat distortion temperature within a range of from 85° to 200° C. as measured in accordance with ASTM D648 under a load of 4.6 kg/cm².

3. The optical information recording medium according to claim 1, wherein the light transmitting substrate has a Rockwell hardness within a range of from M200 to M75 as measured in accordance with ASTM D785.

4. The optical information recording medium according to claim 1, wherein an inter-layer is disposed between the substrate and the light absorptive layer, said inter-layer having a heat distortion temperature within a range of from 50° to 150° C. as measured in accordance with ASTM D648 under a load of 4.6 kg/cm².

5. The optical information recording medium according to claim 4, wherein the inter-layer has a Rockwell hardness within a range of from M100 to M50 as measured in accordance with ASTM D785.

6. The optical information recording medium according to claim 1, wherein a hard layer more hardly heat-deformable than the substrate is disposed on the light reflective layer or between the light absorptive layer and the light reflective layer, said hard layer having a Rockwell hardness of at least M100 as measured in accordance with ASTM D785 and/or a heat distortion temperature of at least 100° C. as measured in accordance with ASTM D648 under a load of 4.6 kg/cm².

7. The optical information recording medium according to claim 1, wherein the substrate is made of a polycarbonate resin, an acrylate resin or an epoxy resin.

8. The optical information recording medium according to claim 1, wherein the light absorptive layer contains a cyanine dye.

9. The optical information recording medium according to claim 1, wherein the reflective layer is made of gold, silver, copper, aluminum or an alloy thereof.

10. The optical information recording medium according to claim 1, wherein the deformable surface layer of the substrate has a tracking guide groove in which said optically readable pits are to be formed.

11. The optical information recording medium according to claim 1, wherein a protective layer is provided as a top layer.

* * * * *